Oct. 6, 1931.  E. HAREL  1,826,662
UNIVERSAL JOINT
Filed Oct. 14, 1929
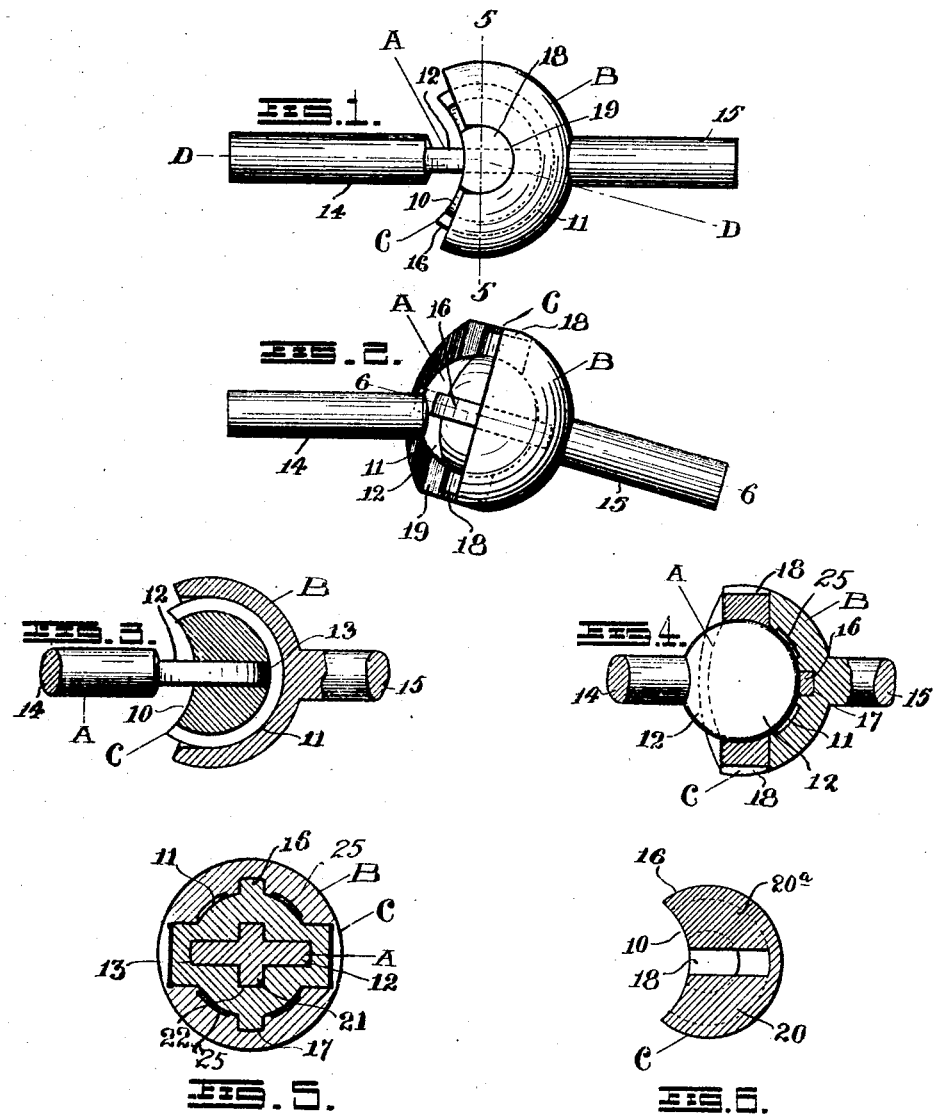
INVENTOR
E. HAREL Patented Oct. 6, 1931

1,826,662

UNITED STATES PATENT OFFICE

EUGENE HAREL, OF OTTAWA, ONTARIO, CANADA, ASSIGNOR OF ONE-THIRD TO JOSEPH MOYNEUR AND ONE-THIRD TO SIMON LABARGE, BOTH OF OTTAWA, ONTARIO, CANADA

UNIVERSAL JOINT

Application filed October 14, 1929, Serial No. 399,508, and in Canada September 12, 1929.

My invention relates to universal joints of that type wherein the meeting point of two axes is relatively constant.

The main object of my invention is to provide a universal joint of the type mentioned in which the rotation at the driven end thereof will be constant with relation to the rotation imparted at the driving end.

Another object is to provide a universal joint having unusually large bearing surfaces as well as great strength, so that it may be used in connection with the wheels of front driven motor vehicles.

A further object is to provide a joint which comprises a minimum of parts, simple in construction, devoid of rivets, bolts or screws, and comparatively inexpensive to manufacture.

Other objects and advantages of my joint will be readily seen while perusing the description herein, which is illustrated by drawings, in which—

Figure 1 is a longitudinal elevation of the joint;

Figure 2 is an elevation taken at right angles to Figure 1, the joint being angular both as shown and downwardly as on lines D—D—D of Figure 1;

Figure 3 is an elevation of the joint as shown in Figure 1 but with two of its members partly bisected;

Figure 4 is a view corresponding to Figure 3 but at right angle thereto;

Figure 5 is a cross section of the joint taken on line 5—5 of Figure 1, showing a slight internal modification thereto;

Figure 6 is a cross section of the intermediate member of the joint.

Similar symbols of reference in the drawings refer to similar or corresponding parts of the invention.

My universal joint consists of three parts only,—namely, a male member, which may be the driving member; a female member, which may be the driven member, or vice versa; and an intermediate member. In the drawings, A represents the driving member, B the driven member, and C the intermediate member. The members A and B are so termed for convenience only, as their function may be reversed if desirable or necessary.

The three members of the joint are in some manner spherically related to one another so that the axis of the driving member and that of the driven member will always meet at the center of the sphere. The intermediate member C, together with member A, form a complete sphere excepting for a cut-away portion 10. These two members fit in the spherical cavity 11 of member B, which is preferably cup-shaped, as shown. Member A, in the form of a disc 12, the exposed edges of which are curved to correspond with the sphere of the intermediate section, is fitted in a corresponding opening in the intermediate member C, its edge 13 resting against the spherical wall of member B. Members A and B have their shafts 14 and 15, respectively, preferably integral therewith, as shown.

It is obvious that rotation of shaft 14 will impart rotation to member C, it being at the same time capable of angular motion in a plane parallel to the disc 12. In order that rotation be in turn imparted by member C to member B, a rib 16, preferably integral to member C, is provided so as to fit in a circumferential groove 17 in member B, as shown. The rib is at right angle to the plane of disc 12 so as to allow a corresponding angular motion between B and C with relation to A. It is, therefore, evident that these two angular motions will allow the joint to transmit rotation steadily and smoothly at any practical angle, such as in Figure 2.

To provide additional tortion bearing between B and C, member C is provided with trunnions 18 resting in semi-circular bearings 19, both trunnions and bearings being on an axis at right angle to the plane of rib 16 and groove 17. The trunnions 18 and rib 16 also serve to hold together the two segments 20 and 20ª of member C, as shown in Figure 6.

So far, member A is described as being held centrally of the assumed sphere by its circumference resting against the spherical inner wall 11 of member B. If desired, trunnions 21, corresponding to trunnions 18 but between members A and C for additional strength and stability, may be provided and will rest in bearing depressions 22. This modification is shown in Figure 5.

It will be noticed that members B and C are substantially semi-spherical to allow one member to enter the other.

In order to lubricate the joint, I have provided slots 25, shown in Figures 4 and 5 as being cut in the female member B of the joint. Their width is preferably extended as shown so as to give the oil ample room to circulate in the sphere between the male and female member.

It is not necessary to describe the functions of the parts forming the joint while in operation as they are self-evident and clearly illustrated in Figure 2.

While I have described my universal joint principally in accordance with the joint as illustrated, it must be understood, however, that I reserve the right to alter the same to suit various requirements and uses without departing from the spirit of my invention and the scope of my claims following.

I claim:

1. A universal joint, comprising a male and a female member, and an intermediate member forming part of said male member, the two forming a sphere adapted to be fitted spherically in the said female member, a rib on said intermediate member fitting in a groove in said female member, and trunnions on said intermediate member on an axis perpendicular to and centrally of the plane of said rib resting in a corresponding semi-circular recess in said female member.

2. A universal joint comprising a pair of driving and driven members and an intermediate member, one of said pair of members forming the central section of a sphere, the intermediate member completing said sphere, the whole adapted to fit spherically in the other member of said pair, positive rotation-imparting means between said intermediate member and said other member, and trunnions centrally of said spherical portion of said one member located in recesses centrally of said intermediate portion.

3. A universal joint comprising a male member, being the central section of a sphere, a female spherical member corresponding in dimension to the said central section, and an intermediate member composed of two chordal spherical sections disposed one on each side of said central section, said sections being integrally held together by a rib disposed at right angle to said central section, and trunnions disposed on the axis thereto and at right angle to said rib, the said rib and trunnions resting in a corresponding groove and recesses respectively in said female member.

4. A universal joint comprising a male member, being the central section of a sphere, a female spherical member corresponding in dimension to the said central section, and an intermediate member composed of two chordal spherical sections disposed one on each side of said central section, said sections being integrally held together by a rib disposed at right angle to said central section, means to unite said chordal sections on an axis thereof lying in the plane of said central section, and means in said female member to allow for said uniting means.

In testimony of the foregoing, I have hereto affixed my signature, October, 1929, at the city of Ottawa, Ontario, Canada.

EUGENE HAREL.